Aug. 4, 1964 R. GUILLOTEAU ETAL 3,143,231
MACHINE FOR THE EXTRACTION OF NUCLEAR FUEL CARTRIDGES
Filed March 28, 1961 4 Sheets-Sheet 1

INVENTORS
RENÉ GUILLOTEAU
GEORGES PETILLAT
BY
Bacon & Thomas
ATTORNEYS

Aug. 4, 1964   R. GUILLOTEAU ETAL   3,143,231
MACHINE FOR THE EXTRACTION OF NUCLEAR FUEL CARTRIDGES
Filed March 28, 1961   4 Sheets-Sheet 3

INVENTORS
RENÉ GUILLOTEAU
GEORGES PETILLAT
BY
Bacon & Thomas
ATTORNEYS

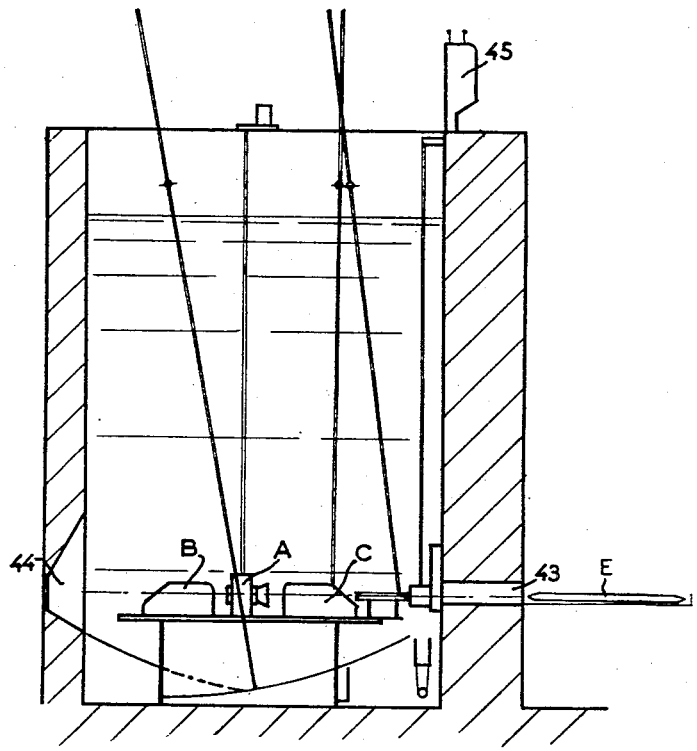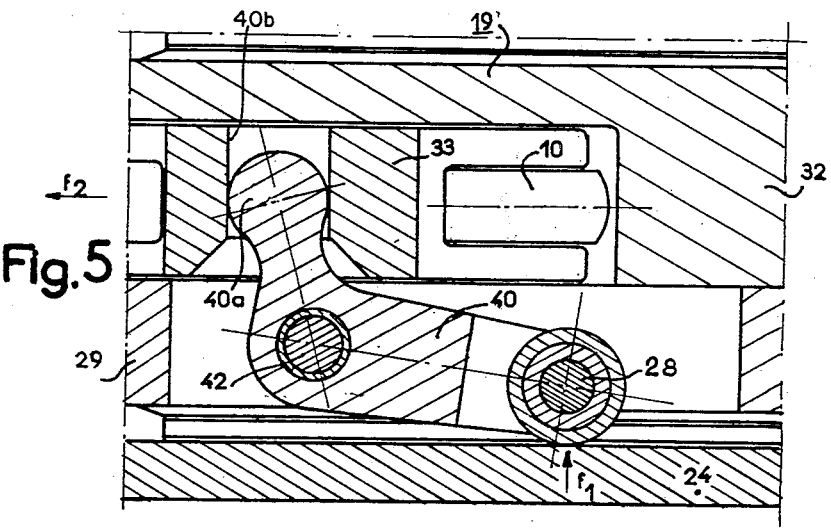

United States Patent Office 3,143,231
Patented Aug. 4, 1964

3,143,231
MACHINE FOR THE EXTRACTION OF
NUCLEAR FUEL CARTRIDGES
René Guilloteau, Cachan, and Georges Petillat, Paris,
France, assignors to Commissariat à l'Energie Atomique, Paris, France
Filed Mar. 28, 1961, Ser. No. 98,916
Claims priority, application France Apr. 15, 1960
7 Claims. (Cl. 214—305)

The present invention relates to a machine for removing irradiated nuclear fuel rods surrounded by their sheaths from a storage casing.

The nuclear fuel cartridges, which have undergone a prolonged irradiation in a reactor, must be stored before they are processed. For this purpose, the cartridges are put into cylindrical casings having an internal diameter which is slightly greater than the external diameter of the sheaths in which the fuel rods are enclosed. These casings, which are made of a light alloy, contain several cartridges and their length is of the order of a metre. The casings are sealed and immersed in a deactivating bath. They are later opened and the cartridges withdrawn in order to process the nuclear fuel, for example, to separate the plutonium therefrom.

One of the objects of the invention is to provide a novel machine whereby withdrawal of the cartridges may be carried out semi-automatically. Due to irradiation hazards, the operator must be protected against exposure and contamination. However, since the cartridges are deformed or distorted in various ways, it is necessary to provide for constant observation of the operation of the machine in such a way that the operators can immediately intervene in the case of accident while maintaining proper protection.

Another object of the invention is to make the removal operation such that the operators are not exposed to contamination, while allowing easy and continuous supervision of the operation.

According to the invention, there is provided a machine for extracting irradiated cartridges of nuclear fuel from their casings, comprising in combination two assemblies, each provided with means for introducing and clamping a casing by its opposite ends in a substantially horizontal position, said casing containing at least one cartridge, means for exerting a longitudinal traction force on the said casing, a cutting head arranged between said assemblies in order to subdivide the casing into two parts, and means for swinging each of the resultant half-casings, into a position in which the open ends thereof are downwardly directed.

The objects and attendant advantages will become apparent as the following description is read in conjunction with the accompanying drawings which show one embodiment of the invention. It is to be expressly understood, however, that the drawings are for illustration only. In the drawings:

FIGURE 5 is an enlarged, cross-sectional, detail view of the operating mechanism for the cutting head shown in FIG. 4, and FIGURE 6 is an overall diagrammatic view of an assembly including a machine according to the invention.

FIGURE 7 is a fragmentary, horizontal, cross-sectional view taken on line 7—7 of FIGURE 2 showing the trunnions, bearings and ramps employed for supporting and guiding the swinging tube holding assembly.

Figure 1:
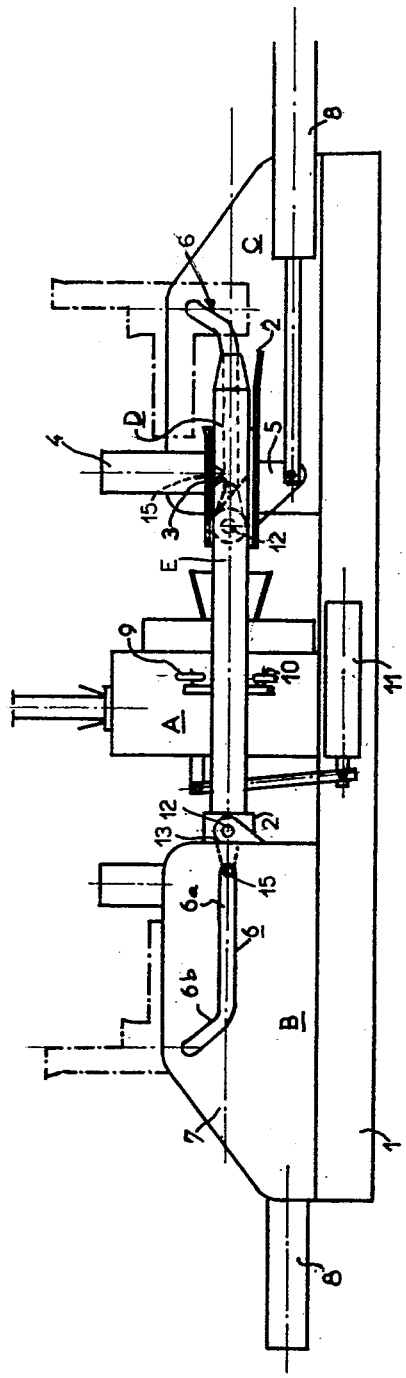
FIGURE 1 is a side elevation of a machine according to the invention, partially in cross-section.

Referring to FIG. 1, the machine comprises a supporting structure or base 1, at the center of which is secured a cutting head A and, on either side of the latter are mounted two similar gripping and swinging assemblies B and C. Assembly B is shown in side elevation, while assembly C is shown partly in cross-section along a vertical plane containing the longitudinal horizontal axis of the machine. Each assembly comprises a reciprocating carriage 5 carrying a swinging assembly D, essentially consisting of a guide tube 2, into which the casing E to be emptied can be introduced, and a clamp 3 for locking one of the ends of the casing with a jack 4 operating the clamp 3. Each swinging assembly is supported, in a way which will later be described in detail, by two pair of horizontal trunnions. One pair of trunnions is integral with the carriage 5 while the ends of the other pair are guided by elongated slots or ramps 6, formed in vertically disposed cheeks 7, located on either side of the assembly and fixedly secured to base 1. A jack 8 is adapted to move the carriage 5 in suitable guides (not shown), along the longitudinal axis of the machine. When the carriage 5 is in the position nearest to the cutting head A, the longitudinal axis of the guide tube 2 is horizontal. When the carriage 5 is in the position furthest away from the cutting head A, the swinging assembly D undergoes a rotation of about 90° with regard to its previous position so that the longitudinal axis of the tube 2 becomes approximately vertical. The swinging assembly has been shown in dash-dot lines in the latter position in FIG. 1.

When the swinging assemblies D of the two assemblies B and C have been moved close to the cutting head, the guide tubes of these assemblies are coaxial. A casing E may be introduced into the machine along this axis with its central portion extending through the cutting head.

In FIG. 1, the tool of the cutting head has been diagrammatically shown as a cutting wheel 9 with the thrust of wheel 9 being taken by a backing roller 10. When the casing E has been introduced into the cutting head and its two ends have been locked by the clamp 3 of the swinging assemblies D, the jacks 8 are actuated to exert a tractive force on the carriages 5 carrying the casing. A jack 11 is then operated to move the cutting wheel 9 toward roller 10. A bevel gear transmission is provided in order to rotate the assembly comprising the wheel 9 and the roller 10 about the casing E. Under the combined action of the pull or strain on the casing exerted by the jacks 8 of the assemblies B and C and the cutting action of the wheel 9, the casing is divided into two halves having approximately the same length. The jacks 8 then drive the carriages apart for moving the swinging assemblies D into the positions shown in dash-dot lines; the two casing halves take up the vertical positions with their open ends downwards so that the cartridges fall out.

Figure 2:
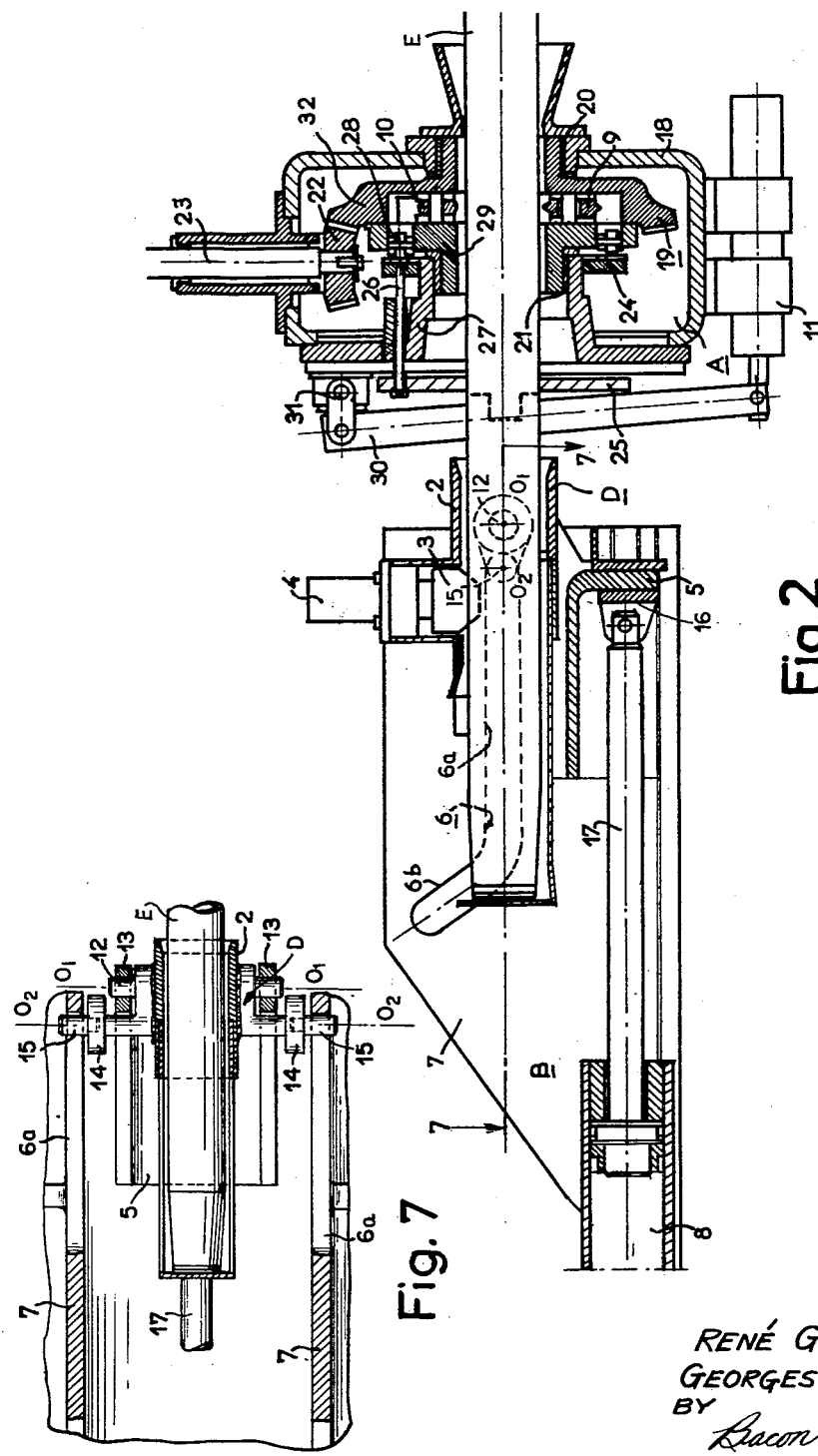
FIGURE 2 is an enlarged cross-sectional view of the cutting head and of one of the gripping and swinging assemblies, which are embodied in the machine of FIG. 1.

FIG. 2 shows the guide tube 2 and the clamp 3 actuated by the jack 4. When the casing E has been introduced into the guide tube 2 with the clamp 3 clear of the casing path, downward movement of the clamp locks the casing in a position where its longitudinal axis coincides with the axis of the guide tube 2. A first pair of trunnions 12 extends outwardly from opposite sides of the forward end of the guide tube 2 and are received in bearings 13 (FIG. 3) mounted on the forward, upper end of the carriage 5 for pivotally supporting the guide tube on the carriage about transverse horizontal axis $\theta_1$. A second pair of trunnions 15 extending outwardly from opposite sides of guide tube 2 are positioned rearwardly of trunnions 12 and are received in elongated slots or ramps 6 in cheeks 7 for pivotally supporting the tube about a horizontal axis $0_2$. Trunnions 15 are mounted in bearings 14 integral with tube 2. It will be seen that the two bearings 13 mounted on the carriage 5 support the two trunnions 12 about which the swinging assembly D may pivot; one trunnion being situated in front of and the other behind the plane of the FIG. 2. Similarly, the two trunnions 15, guided by slots 6 allow the rotation of guide tube 2 about the axis $0_2$.

Figure 3:
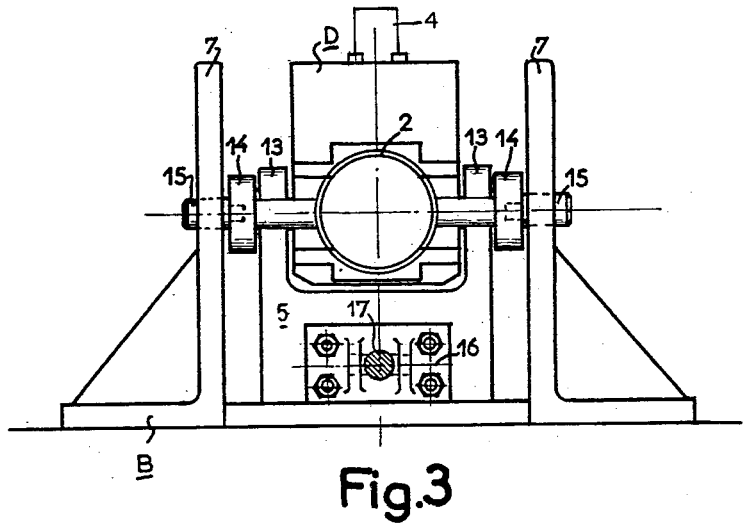
FIGURE 3 is an enlarged end view of one gripping and swinging assembly.

In FIG. 3 have been shown the two cheeks 7 of an assembly and the circular opening of the guide tube 2 of the corresponding swinging assembly D. This assembly is connected to the carriage 5 by the bearings 13 while the bearings 14 associated with the trunnions 15 allow its rotation about a horizontal axis $0_2$, the level of which is a function of the longitudinal position of the carriage. The connection of the jack 8 at the lower portion of the carriage 5 has been indicated at 16.

Referring again to FIG. 2, the carriage 5 can be moved away from the cutting head by means of the jack rod 17. During such displacement, movement of the axis $0_2$ is guided by the slots 6 while the axis $0_1$ remains in the same horizontal plane. The slots 6 comprise at the outer end an oblique portion $6b$ such that at the end of outward travel of carriage 5, the axis $0_2$ is higher than the axis $0_1$, and the guide tube 2 is pivoted from a horizontal position to a position with its longitudinal axis directed vertically. Moreover, as the casing must not be subjected to flexion, the portion $6a$ of slots 6 corresponding to the beginning of the rearward travel of the carriage away from cutting head A are horizontal and parallel with the path of movement of carriage 5 so that the axes $0_1$ and $0_2$ remain at their initial levels during the first part of the travel of the carriage.

FIG. 2 also shows the construction of the cutting head A. It comprises a housing 18 fixed to the frame 1 (not shown). The cutting wheel 9 and the roller 10 are driven by means of the gear indicated generally at 19 which comprises a bevel gear 32 at one side and a bearing flange 29 at the other side thereof. This gear 19 is rotatably supported in housing 18 by friction bearings 20 and 21, on a horizontal axis which is co-axial with the axis of the assemblies B and C. The gear 19 is, itself, driven by a bevel gear 22 arranged at the end of a shaft 23. An electric motor, including a reducing gear and which can be located at some distance above the level of the machine, rotates the shaft 23. A floating assembly, comprising two plates 24 and 25 connected by rods such as 26 sliding in a sleeve 27 forming a part of housing 18, can be displaced along the longitudinal axis of the machine in order to bear upon rollers such as 28, which are carried by gear 19. The displacements of the floating assembly are controlled from the jack 11 and by means of an assembly comprising two curved rods such as 30, leaving the central portion of the cutting head unobstructed, and bearing upon a fixed point 31. According to the position of the floating assembly, the cutting wheel 9 and its backing roller 10 are separated or brought together.

Figure 4:
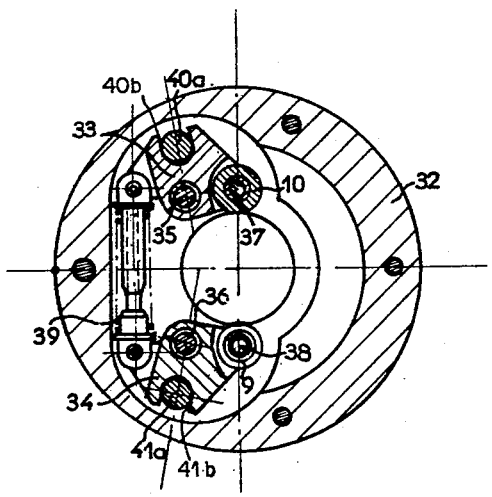
FIGURE 4 is a transverse cross-sectional view of the control mechanism of the cutting wheel and of the backing roller of the cutting head.

The control mechanism of the cutting wheel 9 and its backing roller 10 will now be described with reference to FIG. 4 In a recess formed inside the gear 32, a pair of identical bell-crank levers 33 and 34 are pivotally mounted on pins 35 and 36 perpendicular to the plane of the figure and integral with the gear 32. The roller 10 is mounted for rotation on a shaft 37 carried by the lever 33 while the cutting wheel 9 is mounted for rotation on a shaft 38 carried by the lever 34. A compression spring 39, the ends of which bear upon the levers 33 and 34, urges the cutting wheel 9 and the roller 10 toward each other for engagement thereof with the surface of the casing to be cut. The ends $40a$ and $41a$ of the bell-crank levers 40 and 41, respectively, are received in recesses $40b$ and $41b$ provided respectively in the levers 33 and 34 and are capable of counteracting the force of the spring 39 and of moving the cuttting wheel and the backing roller away from the longitudinal axis of the machine.

In FIG. 5 is shown the bell-crank lever 40 which controls the displacement of the roller 10. This lever is mounted for pivotal movement about a pin 42. Its end $40a$ is received in the recess $40b$ provided in the lever 33 while its other end carries the roller 28. When the member 24 of the floating assembly is displaced in the direction of the arrow $f_1$ under the action of the control jack 11, bell-crank lever 40 is pivoted counterclockwise about pin 42. The finger $40a$ brings about a displacement of the roller 10 in the direction of the arrow $f_2$ by pivoting the lever 33 about shaft 35.

In operation, when a casing is introduced into the cutting head, the cutting wheel and its backing-roller are temporarily held apart by actuating jack 11. The two ends of the casing are clamped by the gripping and swinging assemblies B and C, the jacks 8 of these assemblies being actuated for subjecting the casing to a tensile stress. Actuation of jack 11 is discontinued and under the action of the return spring 39, the cutting wheel 9 and the backing-roller 10 approach each other and engage the casing. When the driving electric motor of the gears has been set in action, the cutting wheel 9 and the roller 10 revolve and cut the casing into two parts. The jacks 8 then move carriages 5 outwardly away from the cutting head A to bring about the tipping of the two half-casings in the manner previously indicated. The cartridges fall into a first chute (not shown), provided for this purpose. Then the clamps 3 of the assemblies B and C are released and the empty half-casings are directed to the first or another chute by the action of a hydraulically controlled sorting mechanism.

The machine according to the invention is intended to operate under water in a trough or well, and is placed at the bottom of the trough on fixed supports. In FIG. 6 there is shown a view of the assembly, with the machine disposed in the trough. The jacks 4, 8 and 11 are fed by flexible tubes attached at one end to the jacks and with the other end thereof extending above the tank and attached to a suitable source of liquid under pressure and which, when necessary, allow the machine to be withdrawn easily from the water. The operators stand on flooring arranged above the trough. Portholes allow the continuous observation of all the movements of the machine and the members to be manipulated. Openings made in the wall of the trough along the longitudinal axis of the machine allow on the one hand the introduction of full casings via the entry 43 and on the other hand the evacuation of the fuel cartridges via the exit 44. These openings are in communication respectively with the storage pool for the full casings which are to be fed to the machine and with the trough in which the cartridges removed from the casings are to be processed.

The preferred driving fluid for the hydraulic jacks is water, in preference to oil, because in the case of a leak of oil, contaminated drops would rise to the surface of the water in suspension and moreover one would no longer have good visibility through the water.

All the jacks ensuring the different movements of the machine are controlled from a control desk 45 by flexible sheathed transmissions. The operation is semi-automatic.

The programmed cycle, when summarized, comprises the following operations:

The introduction of the casing loaded with its cartridges,

The actuation of the clamps which immobilize the casing,

The movement of the cutting wheel towards the casing and the pulling operation effected on the casing, The cutting of the casing, The retraction of the carriages and the dropping of the cartridges from the open ends of the half-casings, The unlocking of the clamps and the dropping of each half-casing, and The return of the carriages.

We claim:

1. A machine for extracting irradiated cartridges of nuclear fuel from their casings, comprising in combination two assemblies, each provided with means for receiving and clamping a casing by its opposite ends in a substantially horizontal position, said casing containing at least one cartridge, means for exerting a longitudinal traction force on the said casing, a cutting head arranged between said assemblies for subdividing the casing into two parts, and means for swinging each of said receiving and clamping means and the resultant half-casings carried thereby into a position in which the open ends of the half casings are downwardly directed.

2. A machine as claimed in claim 1, in which each of said assemblies includes a carriage; and means for reciprocating said carriage in said assembly in the longitudinal direction of the casing, at least one slot formed in said assembly extending parallel to the direction of movement of said carriage, a swinging assembly having a tube into the open end of which one end of the casing is introduced, said swinging assembly being mounted pivotally about a first transverse horizontal axis on said carriage, and about a second horizontal transverse axis in said slot on said assembly, said second pivotal mounting adapted to follow and run along the said slot during the reciprocating travel of the carriage, the part of the slot nearest the cutting head being horizontal and with the part furthest away from said cutting head being oblique with respect to said horizontal part.

3. A machine as claimed in claim 1, in which said cutting head includes a cutting wheel for engaging one side of the casing co-operating with a backing roller for engaging the other side of the casing, the said wheel and the said roller being carried by a ring-like bevel gear, rotating about the horizontal axis of the casing, leaving the neighbourhood of said bevel gear axis free and unobstructed.

4. A machine as claimed in claim 3, in which the axis of said wheel and the axis of the said roller are each carried by one end of a first lever which is pivotally mounted on an axis disposed in a plane parallel to the longitudinal axis of the machine, the free end of each lever being subjected to the action of a return spring.

5. A machine as claimed in claim 4, in which each of the said first levers has a recess in which the end finger of a second pivotally mounted lever engages, the axis of rotation of said second lever being perpendicular to the axes of rotation of the first lever the other end of said second lever carrying a roller in contact with a plate member, which is displaced along the longitudinal axis of the cutting head.

6. A machine as claimed in claim 5, in which the shape of the said levers and the displacement of the said plate member are such that the said wheel and the said backing roller are advanced towards the longitudinal axis of the machine under the action of the said return spring, and are moved away from said longitudinal axis under the action of said plate member.

7. A machine as claimed in claim 5, in which the said plate member is moved axially by the action of a jack which counteracts and overcomes the effect of the said return spring.

References Cited in the file of this patent

UNITED STATES PATENTS

| | | |
|---|---|---|
| 2,186,061 | Berg et al. | Jan. 9, 1940 |
| 2,765,005 | Wellekens | Oct. 2, 1956 |